Dec. 13, 1949 K. H. WILLS 2,491,403
INDICATOR AND CONTROL MEANS
FOR LEAD SCREW CORRECTION
Filed July 16, 1945 3 Sheets-Sheet 1
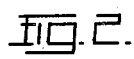
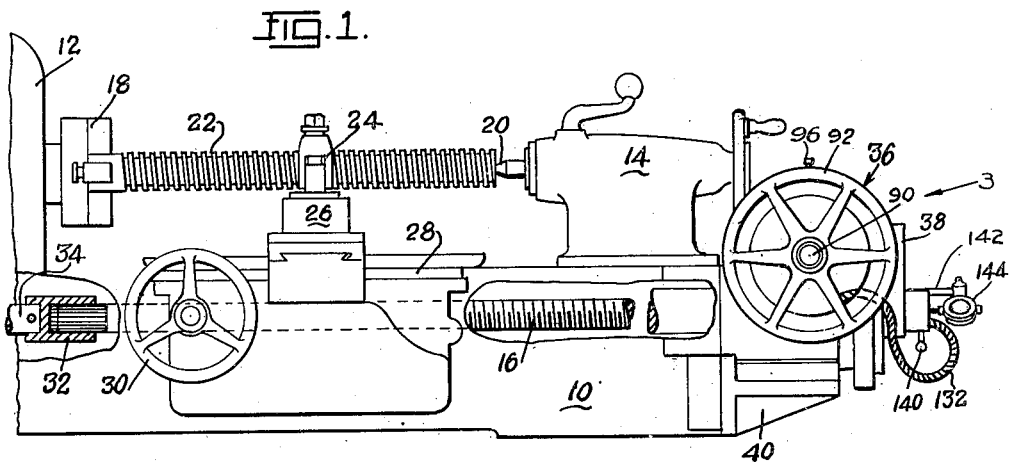
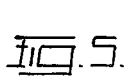
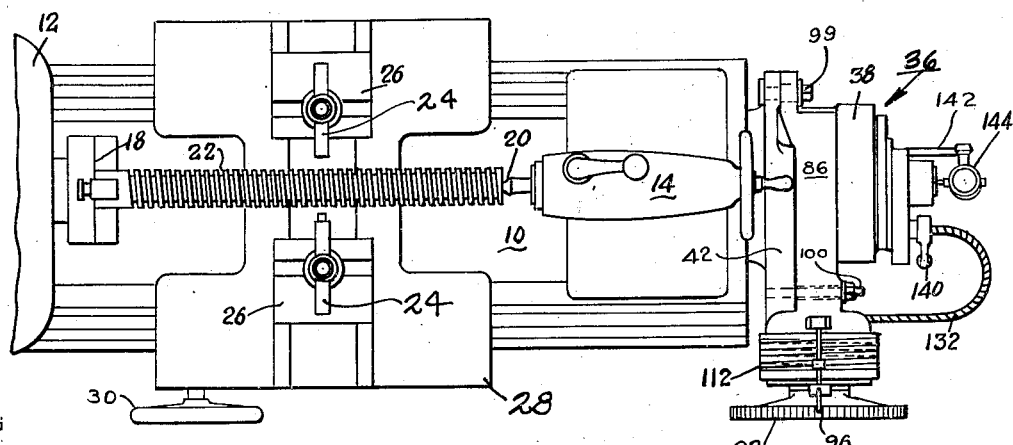
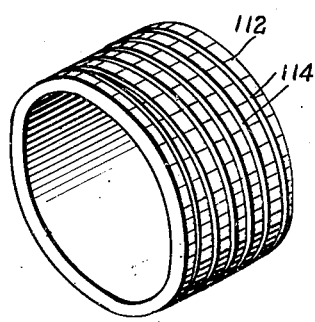
INVENTOR
KURT H. WILLS
BY
Toulmin & Toulmin
ATTORNEYS

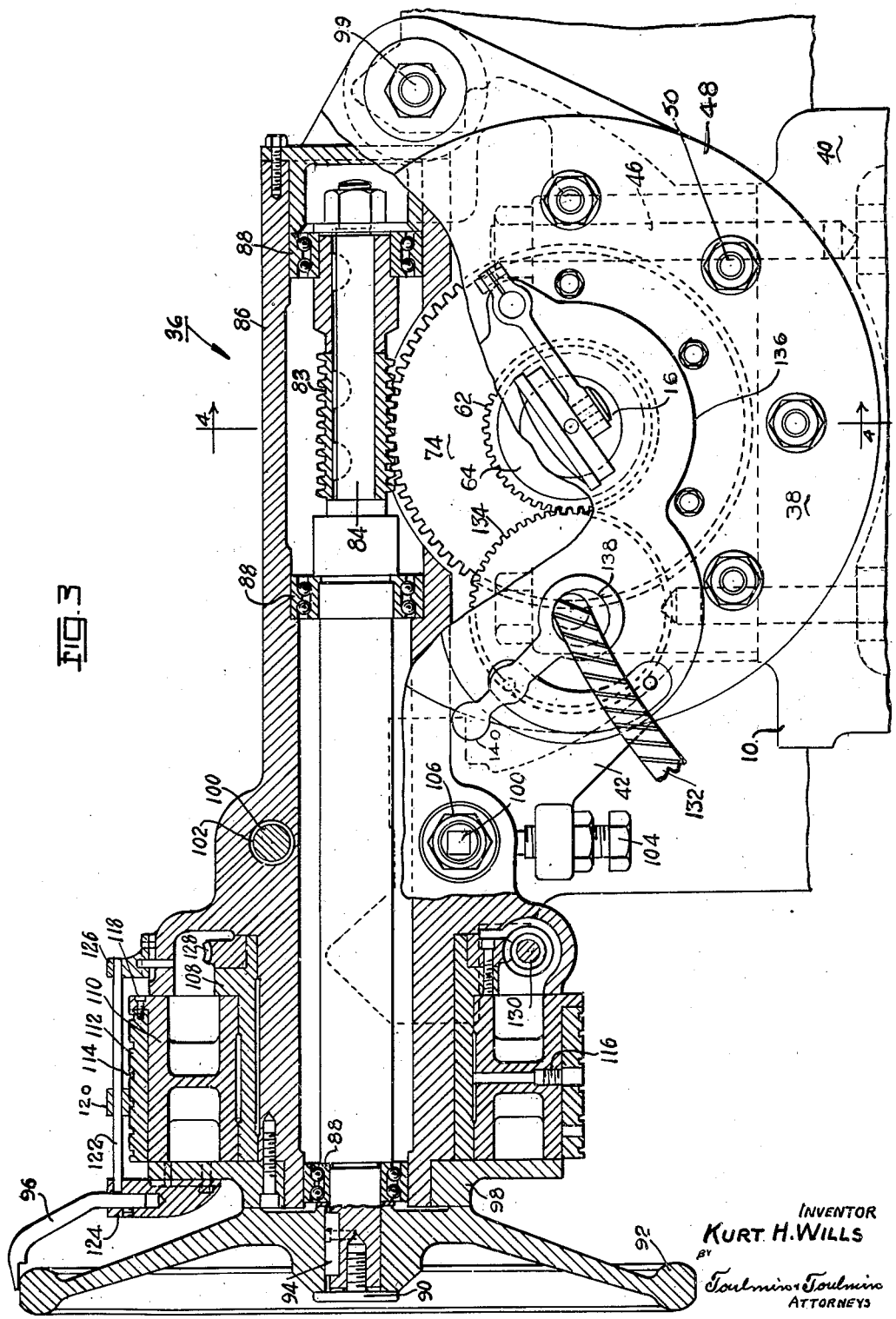

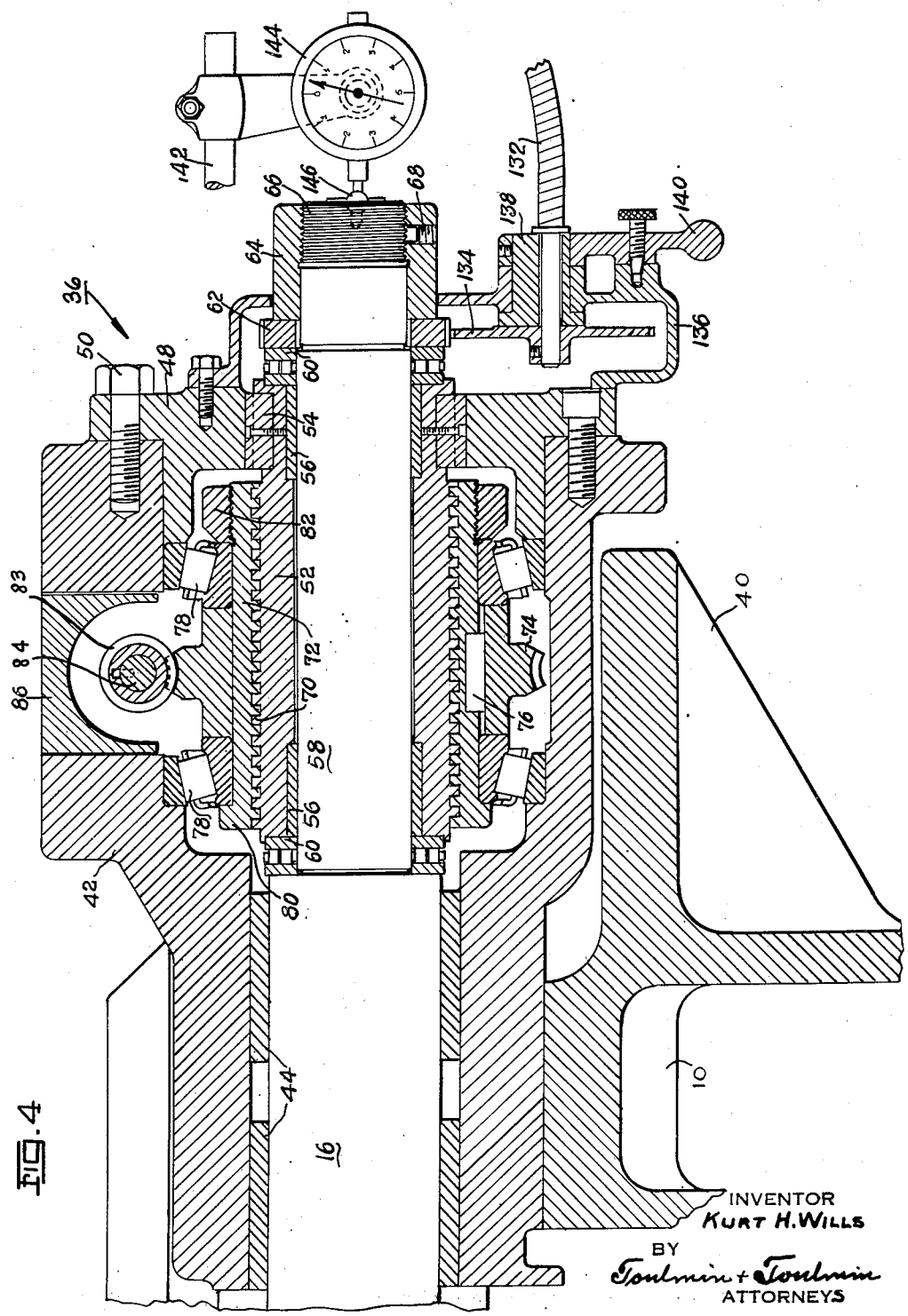

Patented Dec. 13, 1949

2,491,403

UNITED STATES PATENT OFFICE 2,491,403

INDICATOR AND CONTROL MEANS FOR LEAD SCREW CORRECTION

Kurt H. Wills, Sidney, Ohio, assignor to The Monarch Machine Tool Company, Sidney, Ohio, a corporation of Ohio Application July 16, 1945, Serial No. 605,367

3 Claims. (Cl. 116—115.5)

This invention relates to thread chasing and, particularly, to correcting lead errors in thread chasing.

In machine tools such as lathes, grinders and similar machines, the lead screws vary more or less in lead from one end thereof to the other. While these variations are sometimes quite small, they are nevertheless transmitted through the associated mechanism of the machine to the work shaping tool and are reflected in variations in the lead screws being operated in the said machine.

Also due to variations in temperature, yield of the machine parts and deflection of the workpiece, there are various other variables which accumulate to produce errors in the workpiece.

Accordingly, it is an object of the present invention to provide a means for correcting the aforementioned errors so that a workpiece free therefrom may be produced.

It is still another object to provide a means for correcting lead errors in a lead screw which may be operated simultaneously with the machine which is forming the thread.

It is still another object to provide an improved means for indicating the adjustment of the lead screw error correcting means.

It is still another object to provide for the correction of the aforementioned errors by moving the lead screw of a machine tool.

These and other objects and advantages will become more apparent upon reference to the accompanying drawings, in which:

Figure 1 is an elevational view of a portion of a lathe which is equipped with a lead error correcting device according to this invention;

Figure 2 is a plan view of the device shown in Figure 1;

Figure 3 is an enlarged end view taken in the direction of the arrow 3 on Figure 1 and shows more in detail the lead error correcting device;

Figure 4 is a section through the correcting device and is taken on the line 4—4 of Figure 3; and Figure 5 is a perspective view showing the replaceable indicating chart used in connection with the device of Figures 3 and 4.

General arrangement

According to this invention, the lead screw of a machine tool in which a thread is to be chased has associated therewith a mechanism adapted axially to shift the said lead screw selectively in either direction by predetermined distances. While the particular amount which the lead screw is shifted is shown on an indicator connected with a stationary portion of the machine tool the indicator as explained below does not indicate all relative movements between the tool and the work piece. A second indicating mechanism is connected with a handwheel so that any predetermined amount of shift may be imparted to the lead screw by the machine operator.

In association with the aforementioned handwheel is an indicator which indicates the position of the cutting tool which is being driven by the lead screw of the machine. This indicator is suitably marked in inches or centimeters or in any other divisions desired so that the position of the tool on the workpiece being cut can be ascertained at any time.

When a workpiece lead screw has received a rough cut, the thread is checked by any suitable device to detect the lead errors in the thread. These errors are noted together with their locations, the location being indicated by the last mentioned indicating means. Thereafter, the finishing cut is made on the thread and whenever the cutting tool reaches a position on the thread where an error has been noted according to the previous testing operation, the machine lead screw is shifted in one direction or the other in order to compensate for the error. Thus, the cutting tool will move to generate a uniformly accurate thread and the resulting product has a lead true to a high degree of precision.

Structural arrangement

Referring to the drawings, 10 indicates a lathe bed which has a headstock 12, a tailstock 14 and a lead screw 16. The headstock 12 may comprise a chucking means 18 adapted, in cooperation with the tailstock center 20, to support a workpiece 22 on which it is desired to generate a highly accurate lead screw.

Cutting means such as the tools 24 are provided which are mounted on a cross-slide 26 carried on the carriage 28. The carriage 28 is adapted for manual movement by the handwheel 30 and also for automatic power movement by the lead screw 16.

The lead screw 16 is connected by the splined connector 32 with a shaft 34 which is connected by suitable gearing with the work spindle so that a predetermined speed ratio may be obtained therebetween.

Attached to the tailstock end of the bed 10 is a mechanism generally indicated at 36 whose function is selectively to shift the lead screw 16 in either direction. The mechanism at 36 comprises a casing 38 which is carried on the rearwardly extending bracket 40 of the lathe bed. The casing is comprised of parts, the main section 42 of which extends underneath the tailstock and journals the end on the lead screw 16 by means of the radial bearings 44. The portion 42 is attached to the bracket 40 by the screws indicated at 46.

Affixed to the right end of the portion 42, as viewed in Figure 4, there is a cover plate 48 which is held in position by the screws 50. The cover plate 48 has a splined aperture which slidably receives the end of a sleeve 52 which carries the spline engaging keys 54. The sleeve 52 has a bearing 56 in either end thereof which provides radial support for the said sleeve on the reduced diameter end 58 of the lead screw 16. A pair of roller thrust bearings 60 abut the sleeve 52 on either end for preventing axial movement thereof relative to the lead screw 16. The left-hand bearing 60 abuts the shoulder between the lead screw 16 and the reduced diameter portion 58 thereof while the right-hand bearing 60 is abutted by a gear 62 which is secured in position by the internally threaded sleeve 64 which is screwed to the lead screw on the threads 66. The sleeve 64 is located in position by a set screw 68.

The hollow sleeve 52 is externally threaded as at 70, preferably with a square thread, and is engaged by a nut 72 which has keyed thereto a worm wheel 74 by the key 76.

The worm wheel is located between a pair of tapered roller bearings 78 which are received between a recess in the portion 42 and an inwardly extending flange on the cover plate 48. A shoulder 80 on one end of the nut 72 and a threaded locking ring 82 on the other end thereof lock said nut against the inner races of the tapered bearings so that axial movement of the said nut and the worm wheel 74 is prevented.

Referring to Figures 3 and 4 it will be seen that worm wheel 74 is adapted for engagement by a worm 83 which is keyed to a shaft 84 extending horizontally and at right angles to the lead screw 16. The shaft 84 is journaled in a portion 86 on the housing 38 on the anti-friction bearings 88 which are adapted for preventing axial movement of the said shaft.

Secured to the left-hand end of the shaft 84 by a screw 90 is a handwheel 92 which is graduated around its periphery as indicated in Figure 2. The handwheel is keyed to the said shaft by a key 94 so that rotation of the handwheel is effective also to rotate the shaft. A pointer at 96 is carried on the flange 98 secured to the left end of the housing portion 86 for indicating the exact position of the handwheel.

The housing portion 86 is connected by a bolt 99 at the right end thereof with the housing portion 42. A pair of bolts 100 adjacent the left end of the housing portion are adapted for clamping the said housing portions together. The bolts 100 extend through clearance holes 102 in the housing 86 so that vertical adjustment of the said housing portion may be had. An adjusting screw 104 is carried in a lug on the housing portion 42 and is adapted for abutting the under side of the portion 86. By loosening the nuts 106 on the bolts 100, the screw 104 may be rotated to adjust the housing portion 86 about the bolt 99 thereby to take up for wear and lost motion between the worm 83 and the worm wheel 74.

The left end of the housing 86 provides a journal for a sleeve 108 which mounts a drum 110 adapted for receiving a sleeve 112 which has a spiral groove 114 cut therein. The locking screw 116 locks the drum 110 to the sleeve 108 while the screws 118 secure the sleeve 112 to the drum 110. A follower 120 having a depending portion adapted for engaging the spiral groove 114 is carried on the square bar 122 which is fastened in the brackets 124 and 126.

Secured to the sleeve 108 is a worm wheel 128 which is engaged by the worm 130. The worm 130 is connected by a flexible drive shaft 132 with a gear 134 carried in a housing 136 attached to the cover plate 48. The gear 134 is adapted for meshing with the gear 62 so that rotation of the lead screw 16 will also rotate the gear 134 and, through the flexible shaft 132 and the worm and wheel 130, 128 drive the sleeve 112. The gear 134 is mounted in an eccentric block 138 and to which is connected an arm 140 which may be positioned to disengage the said gear from the gear 62. Thus, the drive from the lead screw to the sleeve 112 may selectively be made effective or ineffective.

Mounted on a rod 142 which is stationarily supported by the casing 38 is an indicator 144 the plunger of which is engaged by a ball 146 carried in the end of the lead screw 16. The indicator 144 is for the purpose of indicating exactly what adjustment has been imparted to the lead screw 16 so the operator can make subsequent adjustments in conformity therewith.

*Operation*

In operation, assume that the work piece 22 has had a thread roughly chased thereon with sufficient material yet to be removed to allow for compensation of errors. It is now desired to gauge the thread in order to detect and record the aforementioned errors. The gauging means, which may comprise any indicating means well-known to those skilled in the art are mounted on the carriage 28 and the thread is traversed and the indication of the testing device is noted at predetermined intervals.

For example, it may be desired to note the error of the thread of the work piece 22 every four threads. Thus, with the indicator at zero the work piece is rotated four revolutions and the error as indicated by the testing device is noted. Thereafter, the testing device is again set to zero and the work piece is rotated another four revolutions, the indicator reading being noted at the end of the four revolutions. This process is repeated until the entire thread has been traversed and the indicator readings have been noted for each four revolutions.

After the testing operation has been completed, the testing device is removed from the carriage and the operator commences the finishing cut on the work piece. While this cut is being accomplished, the handwheel 92 is adjusted in accordance with the noted errors as the follower 120 indicates on the sleeve 112 that the point for which the error is intended has been reached. If the errors are all in one direction, that is all positive or all negative, the graduations on the handwheel 92 are sufficient for making the corrections. However, if the corrections are alternately positive and negative, it is preferable that the reading of the indicator 144 be the guide by which the corrections are made.

It will be apparent that the resulting screw has a thread with a high degree of accuracy which is substantially independent of temperature conditions, yield in the machine tool, deflections in the work piece or errors in the machine tool lead screw.

An advantage to be found in the present construction over previous constructions is that of the sleeve 112. The sleeve 112 is free of stretch and variations due to temperature differences as would be the case if a steel tape were used for an indicating means. The sleeve 112 is also adapted for being calibrated in any manner in which it is desired.

For example, the sleeve 112 may be divided off in inches, centimeters, number of threads or in any other manner which would conveniently designate the various points along the work piece where it is desired to make a correction.

It will be understood that I desire to comprehend within my invention any modifications that may be considered to come within the scope of the invention and the appended claims.

I claim:

1. In a machine tool having a bed and having a longitudinal lead screw rotatable relative to the bed to drive a first holder relative to a second holder upon rotation of the lead screw, and means to longitudinally shift the lead screw for adjusting the relative position of the first holder and the second holder, the provision of a combination hand operated control and an indicator to indicate the said relative position of said first and second holders within the accuracy of the lead screw and the indicator but exclusive of relative movement provided by said longitudinal shifting, said hand operated control comprising an actuating member and a shaft for operating the means to shift the lead screw, said indicator comprising a bearing about said shaft, a revoluble member mounted on said bearing to revolve about said shaft, indicia on the surface of said revoluble member, indicating means positioned relative to said indicia whereby readings may be observed on the revoluble member to indicate a function of the angular position of the lead screw relative to the bed, and power means to drive said revoluble member from said lead screw with a fixed ratio of revolving speed with respect to said lead screw.

2. In a machine tool having a bed and having a longitudinal lead screw rotatable relative to the bed to drive a tool holder relative to a work holder upon rotation of the lead screw, and means to longitudinally shift the lead screw for adjusting the relative position of the tool holder and the work holder, the provision of a combination hand operated control and an indicator to indicate the said relative position of said holders within the accuracy of the lead screw and the indicator exclusive of relative movement provided by said longitudinal shifting, said combination comprising a housing member, means to attach said housing member to said machine tool, said housing member having a bearing surface therearound, a revoluble member mounted on said housing bearing surface, indicia on the surface of said revoluble member, indicating means positioned relative to said indicia whereby readings may be observed on the revoluble member, worm and gear means to rotatably drive said revoluble member, means to hold said revoluble member on said housing bearing surface, and power driving means to drive said worm and gear means from said lead screw with a fixed ratio of revolving speed between said revoluble member and lead screw.

3. In a machine tool having a bed and having a longitudinal lead screw rotatable relative to the bed to drive a first holder relative to a second holder upon rotation of the lead screw, and means to longitudinally shift the lead screw for adjusting the relative position of the first and second holders, the provision of a combination hand operated control and an indicator to indicate the said relative position of said first and second holders within the accuracy of the lead screw and the indicator but exclusive of relative movement provided by said longitudinal shifting, said combination comprising a housing member, a handwheel mounted at one end of said housing, a shaft extending through said housing to drive said means to shift the lead screw by said handwheel, bearing means to mount said shaft in said housing, means to attach said housing member to said machine tool, said housing member having a bearing surface therearound, a revoluble member mounted on said housing bearing surface, indicia on the surface of said revoluble member, indicating means positioned relative to said indicia whereby readings may be observed on the revoluble member, worm and gear means to rotatably drive said revoluble member, means to hold said revoluble member on said housing bearing surface, and power driving means to drive said worm and gear means from said lead screw with a fixed ratio of revolving speed between said revoluble member and lead screw.

KURT H. WILLS.

REFERENCES CITED

The following references are of record in the file of this patent:

UNITED STATES PATENTS

| Number | Name | Date |
| --- | --- | --- |
| 1,357,903 | Richardson | Nov. 2, 1920 |
| 2,309,299 | Bickel | Jan. 26, 1943 |